US008648547B2

(12) United States Patent
Akins

(10) Patent No.: US 8,648,547 B2
(45) Date of Patent: Feb. 11, 2014

(54) HIGH EFFICIENCY LED LIGHTING

(75) Inventor: Chip Akins, San Jose, CA (US)

(73) Assignee: Uni-Light LLC, San Jose, CA (US)

( * ) Notice: Subject to any disclaimer, the term of this patent is extended or adjusted under 35 U.S.C. 154(b) by 552 days.

(21) Appl. No.: 12/942,761

(22) Filed: Nov. 9, 2010

(65) Prior Publication Data

US 2011/0109229 A1  May 12, 2011

Related U.S. Application Data

(60) Provisional application No. 61/259,496, filed on Nov. 9, 2009.

(51) Int. Cl.
| G05F 1/00 | (2006.01) |
| H05B 37/02 | (2006.01) |
| H05B 39/04 | (2006.01) |
| H05B 41/36 | (2006.01) |
| H05B 37/00 | (2006.01) |
| H05B 39/00 | (2006.01) |
| H05B 41/00 | (2006.01) |
| H01J 7/24 | (2006.01) |
| H01J 17/28 | (2006.01) |
| H01J 13/32 | (2006.01) |
| H01J 19/74 | (2006.01) |
| H01J 61/52 | (2006.01) |

(52) U.S. Cl.
USPC .......... 315/294; 315/113; 315/209 R; 315/312

(58) Field of Classification Search
None
See application file for complete search history.

(56) References Cited

U.S. PATENT DOCUMENTS

| 5,663,719 | A | 9/1997 | Deese et al. |
| 6,471,716 | B1 | 10/2002 | Pecukonis |
| 7,948,190 | B2 * | 5/2011 | Grajcar ..................... 315/291 |
| 2005/0007770 | A1 | 1/2005 | Bowman et al. |
| 2005/0281030 | A1 | 12/2005 | Leong et al. |
| 2007/0081330 | A1 | 4/2007 | Lee et al. |
| 2007/0236155 | A1 | 10/2007 | Kao et al. |
| 2008/0202312 | A1 | 8/2008 | Zane et al. |
| 2008/0238343 | A1 | 10/2008 | Hargenrader et al. |
| 2009/0021180 | A1 | 1/2009 | Underwood et al. |
| 2009/0085503 | A1 | 4/2009 | Narita et al. |
| 2009/0251068 | A1 * | 10/2009 | Holec et al. .................. 315/294 |

* cited by examiner

*Primary Examiner* — Douglas W Owens
*Assistant Examiner* — Dedei K Hammond
(74) *Attorney, Agent, or Firm* — Kilpatrick Townsend & Stockton LLP

(57) ABSTRACT

An LED lighting system may include one or more light-emitting diodes and one or more power management modules. Components of the LED lighting system may be selected and arranged, for example, to match a load voltage to an operating voltage. Matching the load voltage to the operating voltage may enable efficient use of power by the LED lighting system. A method of selecting components of the LED lighting system is provided. For example, the components may be selected based on a target luminance and a given operating voltage. The method may be facilitated and/or implemented with a computer.

22 Claims, 9 Drawing Sheets

HIGH EFFICIENCY LED LIGHTING

CROSS-REFERENCES TO RELATED APPLICATIONS

The present application claims priority of U.S. Provisional Patent Application No. 61/259,496, filed Nov. 9, 2009, the full disclosure of which is incorporated herein by reference.

FIELD OF THE INVENTION

This invention pertains generally to lighting, and, more particularly, to electrical lighting.

BACKGROUND OF THE INVENTION

Every year, billions of kilowatt-hours of electricity are consumed throughout the world for lighting purposes. Unfortunately, not all of the energy contained in that electricity becomes light. In fact, much of the energy is wasted. For example, it is not uncommon for incandescent lighting to have a luminous efficiency in the 2-3% range. Of course, different lighting technologies can have different energy conversion efficiencies, and several lighting technologies improve upon basic incandescent lighting. For example, practical light-emitting diode (LED) based lighting can have luminous efficiencies over 20%. A high luminous efficiency provides a good base to work from, but there are other factors that influence the overall efficiency of practical LED-based lighting systems ("LED lighting systems").

Electric power is supplied for use in many different forms. For example, a basic difference is between direct current (DC) and alternating current (AC). Light-emitting diodes are typically designed to be powered by direct current. However, electric power is commonly distributed as alternating current. Consequently, conversion between the two forms (i.e., rectification) is a common feature of LED lighting systems. Losses during rectification, and power management in general, can be significant. In the context of the scale of the application, even small improvements are sought after.

Further efficiencies are possible if a lighting system is dimmable. For example, a user of the lighting system may adjust the output, and therefore the power consumption, of the lighting system in response to changing needs and, in particular, may dim the output when peak output is unnecessary. The lighting system may even be configured to dim automatically in response to ambient light conditions, for example, as part of a daylight harvesting system. However, not all power conditioning equipment is compatible with dimming functionality and/or conventional dimming components such as TRIAC-based dimmers.

Conventional solutions to efficiently powering a dimmable LED-based lighting system have shortcomings beyond energy losses. Some conventional solutions generate relatively high levels of electro-magnetic interference (EMI) including radio frequency (RF) noise. Some conventional solutions are impractically expensive and/or economically uncompetitive. Some conventional solutions behave poorly in contexts where relatively small form factors are desirable. Some conventional solutions scale poorly to smaller form factors. Some conventional solutions have relatively short operational lifetimes and/or a relatively high chance of failure, for example, because they use a relatively high number of components and/or use relatively low quality components to remain economically competitive.

BRIEF SUMMARY OF THE INVENTION

An LED lighting system is described. The LED lighting system may include one or more light-emitting diodes and one or more power management modules. Components of the LED lighting system may be selected and arranged, for example, to match a load voltage to an operating voltage. Matching the load voltage to the operating voltage may enable efficient use of power by the LED lighting system. A method of selecting components of the LED lighting system is described. The components may be selected based on a target luminance and a given operating voltage. The method may be facilitated and/or implemented with a computer.

This Brief Summary of the Invention is provided to introduce a selection of concepts in a simplified form that are further described below in the Detailed Description of the Invention. This Brief Summary of the Invention is not intended to identify key or essential features of the claimed subject matter, nor is it intended to be used as an aid in determining the scope of the claimed subject matter.

BRIEF DESCRIPTION OF THE DRAWINGS

Same numbers are used throughout the disclosure and figures to reference like components and features.

DETAILED DESCRIPTION OF THE INVENTION

In an embodiment of the invention, an LED lighting system may include a set of light-emitting diodes and one or more power management modules. The power management module(s) may be supplied with electric power by any suitable electric power source including direct current and alternating current. Alternating current power may be rectified. A direct current operating voltage may established. The power management module(s) may be adapted to any suitable operating voltage.

The LED lighting system may be designed to output a target luminance. For example, the LED lighting system may be designed to replace an existing lighting system that generates a particular luminance. The set of light-emitting diodes may be chosen based on, for example, the target luminance and the established operating voltage. The choice of the set of light-emitting diodes may establish an LED load for the power management module(s). The power management module(s) may be adapted to the LED load. Adaptation of the power management module(s) to the LED load may enhance a power use efficiency of the LED lighting system.

A number of components in the power management module(s) may be optimized, for example, minimized. Optimizing the number and/or type of components in the power management module(s) may lower a pecuniary cost of the LED lighting system, for example, a cost at installation, a cost to own over a time period and/or an operating cost. Optimizing the number and/or type of components in the power management module(s) may reduce levels of electro-magnetic interference generated by the power management module(s). Optimizing the number and/or type of components in the power management module(s) may enhance an operational lifetime of the LED lighting system. Optimizing the number and/or type of components in the power management module(s) may enable adaptation of the LED lighting system to small form factors.

In an embodiment of the invention, the LED lighting system may be dimmable. Dimming of the LED lighting system may be controlled with conventional dimming components such as TRIAC-based dimmers. The power management module(s) may incorporate automatic dimming functionality such as daylight harvesting functionality.

Figure 1:
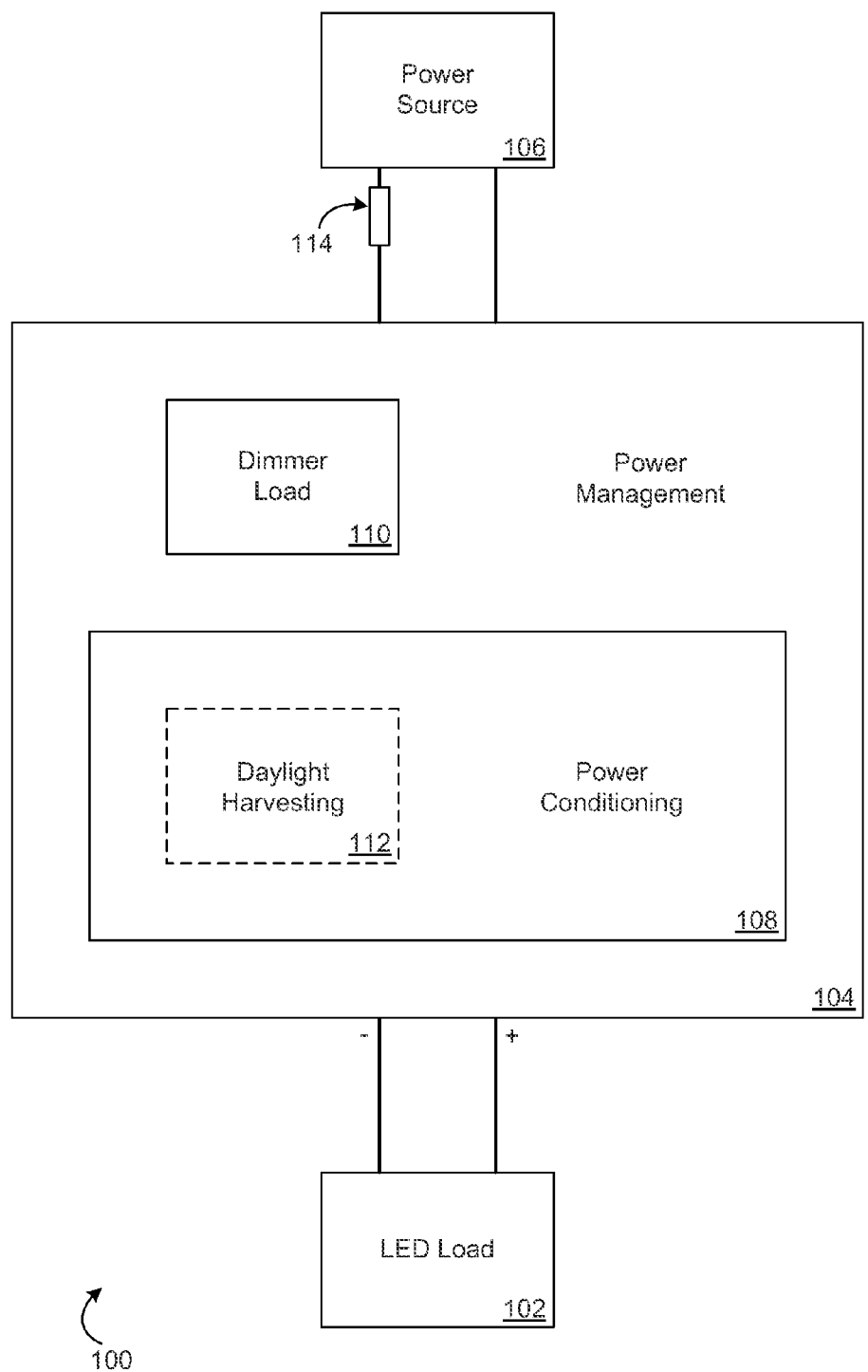
FIG. 1 is a schematic diagram depicting an example LED lighting system in accordance with an embodiment of the invention.

Before describing an LED lighting system in accordance with an embodiment of the invention in more detail, it will be helpful to have reference to an example. FIG. 1 depicts an example LED lighting system 100 in accordance with an embodiment of the invention. The LED lighting system 100 may include an LED load 102 and a power management module 104. The power management module 104 may receive electric power from a power source 106, and may supply electric power to the LED load 102. The power management module 104 may include a power conditioning module 108 and a dimmer load 110. The power conditioning module 108 may incorporate automatic dimming functionality such as a daylight harvesting module 112. In FIG. 1, the daylight harvesting module 112 is depicted with a dashed line to indicate that, in this example, the daylight harvesting module 112 is integrated into the power conditioning module 108. The circuit connecting the power source 106 to the power management module 104 may include a fusible 114.

The LED load 102, the power management module 104, the power conditioning module 108, the dimmer load 110 and the daylight harvesting module 112 are each examples of circuit modules. Circuit modules in accordance with an embodiment of the invention may include any suitable number and/or type of electronic components. Examples of suitable electronic components include resistors, capacitors, inductive devices, transistors including bipolar junction transistors (BJTs), field effect transistors (FETs), thyristors and phototransistors, diodes including Zener diodes, light-emitting diodes (LEDs) and photodiodes, triodes, integrated circuits (ICs) including analog ICs and digital ICs such as processors and programmable logic devices, switches, excessive current and/or voltage protection devices, piezoelectric devices, transducers, and optoelectronic devices. Electronic components are examples of circuit module components. Circuit modules are examples of LED lighting system modules.

The power source 106 may be any suitable electric power source including direct current power sources and alternating current power sources. United States alternating current mains power of 120 volts at 60 hertz is an example of a suitable alternating current power source. The power management module 104 may be configured to convert the electric power supplied by the power source 106 to a form suitable for the LED load 102. For example, the power management module 104 may convert alternating current electric power supplied by the power source 106 to direct current electric power suitable for the LED load 102. In the example depicted in FIG. 1, the direct current output from the power management module 104 to the LED load 102 has a particular associated polarity as indicated by '+' and '−' symbols.

The power management module 104 may utilize the power conditioning module 108 to condition the electric power supplied by the power source 106. Power conditioning performed by the power conditioning module 108 may include rectification, frequency filtering, current control, dimming response including linear dimming response and nonlinear dimming response, and daylight harvesting including automatic dimming in response to ambient, sampled, sensed and/or detected light levels. The power conditioning module 108 may utilize the daylight harvesting module 112 to provide automatic dimming functionality including daylight harvesting functionality. The daylight harvesting module 112 may sample, sense and/or detect ("sense") light levels such as an amount of light contributed to a particular physical environment by ambient daylight. Responsive to sensed light levels, the daylight harvesting module 112 may automatically dim the output of the power management module 104. For example, power supplied by the power management module 104 to the LED load 102 may be reduced in voltage and/or current.

The power source 106 may be influenced by one or more conventional dimming components (not shown in FIG. 1). The power management module 104 may adapt to dimmed power supplied by the power source 106. For example, the power management module 104 may adapt to reduced voltage, current and/or frequency supplied by the power source 106. The conventional dimming component(s) may include a TRIAC-based dimmer well known to those of skill in the art. The conventional dimming component(s) may be designed to influence the power source 106 to dim the output of conventional lighting such as incandescent lighting. For example, the conventional dimming component(s) may be designed to dim a conventional lighting load. The dimmer load 110 may respond to conventional dimming of the power source 106 such that the power management module 104 appears to the conventional dimming component(s) as the conventional lighting load.

The fusible 114 may be any suitable excessive current and/or voltage protection device. For example, the fusible 114 may be configured to break the electric circuit connecting the power source 106 to the power management module 104 if a voltage level and/or a current flow exceeds one or more thresholds. The threshold(s) may be set to be less than maximum voltage and/or current level ratings of one or more components of the power management module 104.

Figure 2:
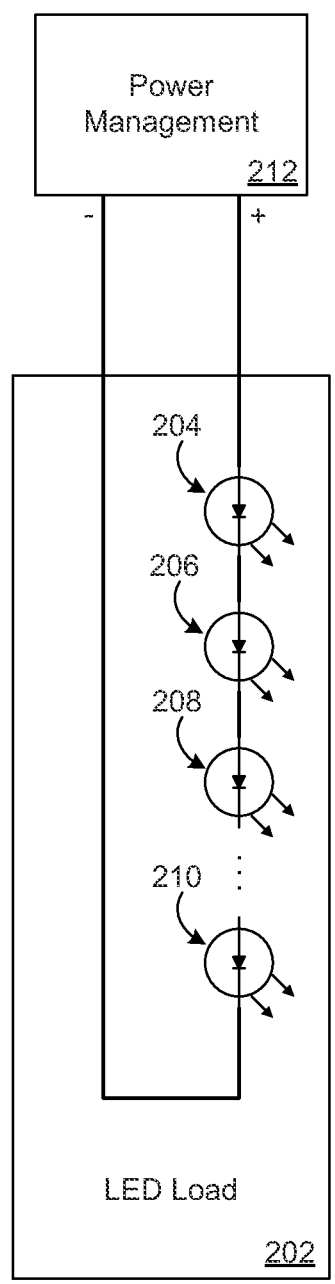
FIG. 2 is a schematic diagram depicting an example LED load in accordance with an embodiment of the invention.

The LED load 102 may incorporate one or more light-emitting diodes. Electric power supplied by the power management module 104 may be routed through the light-emitting diode(s) of the LED load 102 to cause them to emit light. FIG. 2 depicts an example LED load 202 in accordance with an embodiment of the invention. The LED load 202 includes multiple light-emitting diodes 204, 206, 208, 210. FIG. 2 includes a "..." symbol between the light-emitting diode 208 and the light-emitting diode 210 to indicate that the LED load 202 may include any suitable number of light-emitting diodes 204, 206, 208, 210. The LED load 202 is connected to a power management module 212 that supplies the LED load 202 with direct current electric power. The LED load 202 is an example of the LED load 102 of FIG. 1. The power management module 104 of FIG. 1 is an example of the power management module 212.

The light-emitting diodes 204, 206, 208, 210 may be of any suitable type including miniature LEDs, high power LEDs and multicolor LEDs. In an embodiment of the invention, the light-emitting diodes 204, 206, 208, 210 may be considered to be of a same type if they have at least one matching attribute. Light-emitting diode 204, 206, 208, 210 attributes may be considered to match if they have values within a manufacturing tolerance. The light-emitting diodes 204, 206, 208, 210 may each be of a same type. However, each embodiment of the invention is not so limited. The LED load 202 may include any suitable variety of types of light-emitting diode. In the LED load 202, the light-emitting diodes 204, 206, 208, 210 are connected in series. However, each embodiment of the invention is not so limited. The light-emitting diodes 204, 206, 208, 210 may be connected in any suitable configuration.

Figure 3:
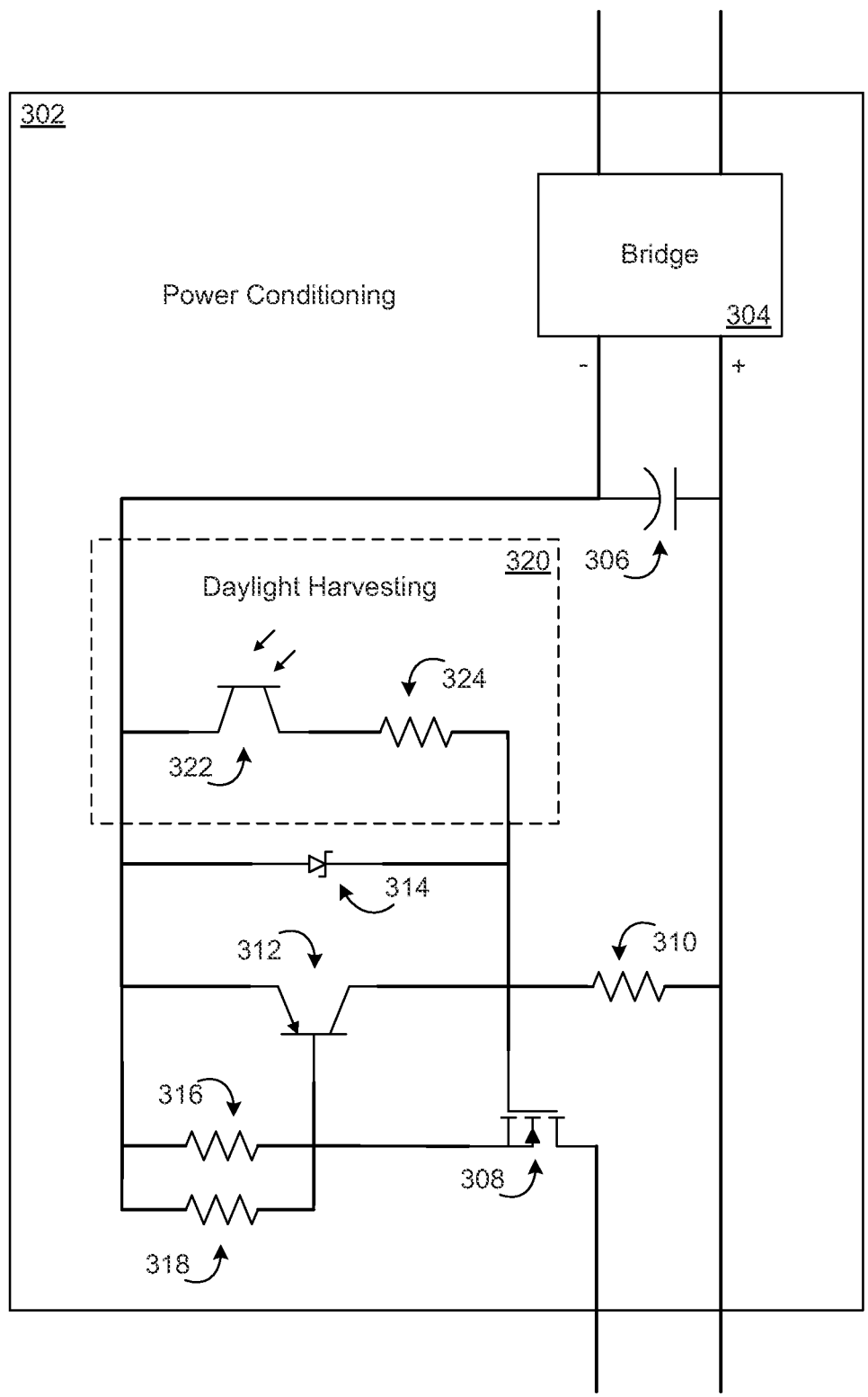
FIG. 3 is a schematic diagram depicting an example power conditioning module in accordance with an embodiment of the invention.

In an embodiment of the invention, a number and/or type of components in the power management module 104 (FIG. 1) may be optimized. In particular, a number and/or type of components in the power conditioning module 108 may be optimized. FIG. 3 depicts an example power conditioning module 302 in accordance with an embodiment of the invention. The power conditioning module 302 is an example of the power conditioning module 108 of FIG. 1.

The power conditioning module 302 may receive electric power at a bridge 304. For example, the power conditioning module 302 may receive an alternating current from the power source 106 of FIG. 1. The bridge 304 may be any suitable bridge rectifier including a diode bridge rectifier. The output of the bridge 304 may be rectified electric power. In particular, the bridge 304 may output a rectified voltage waveform dependent on the input voltage waveform. The operation and performance of bridge circuit modules such as the bridge 304 is well understood by those of skill in the art, so it need not be detailed here.

The bridge 304 may be connected in parallel to a capacitor 306. The capacitor 306 may smooth the rectified voltage waveform output by the bridge 304 to more closely approximate a pure direct current voltage. The bridge 304 and the capacitor 306 may together be considered a rectifying circuit module, and the voltage across the capacitor 306 may be considered as an output of the rectifying circuit module. The voltage across the capacitor 306 may be considered as establishing an operating voltage for other components of the power conditioning module 302 and/or for other modules to which the power conditioning module 302 supplies power such as the LED load 102 of FIG. 1. The rectifying circuit module may be considered to maintain the operating voltage. For example, mains power of 120 volts at 60 hertz supplied to the bridge 304 may result in a nominal 151 volts direct current operating voltage across the capacitor 306 with a capacitance value of 47 microfarads. The capacitor 306 may be a long life capacitor such as an aluminum electrolytic capacitor. In an embodiment of the invention, selecting a long life capacitor for the capacitor 306 extends a lifetime of the power conditioning module 302.

A flow of current through the power conditioning module 302, and/or a load such as the LED load 102 (FIG. 1) connected to the power condition module 302, may be controlled and/or regulated with a set of one or more transistors. The set of transistors may include a current control transistor 308. For example, the current control transistor 308 may maintain the current flow below a threshold value such as a safe, maximum and/or optimum value of current flow for the LED load 102 and/or one or more of the light-emitting diodes 204, 206, 208, 210 (FIG. 2) therein. As depicted in FIG. 3, the current control transistor 308 may be a field effect transistor such as a MOSFET. However, each embodiment of the invention is not so limited. For example, the current control transistor 308 may be a bipolar junction transistor. The set of transistors may further include a current sensing transistor 312. For example, the current sensing transistor 312 may be a bipolar junction transistor. A voltage at the gate of the current control transistor 308 may be influenced by a pull-up resistor 310 and the current sensing transistor 312. A collector of the current sensing transistor 312 may be connected to the gate of the current control transistor 308. The pull-up resistor 310 may separate the gate of the current sensing transistor 308 from the positive polarity of the operating voltage. For example, a resistance of 100 kilohms may be a suitable value for the pull-up resistor 310 when the operating voltage is 151 volts. The voltage at the gate of the current control transistor 308 may be controlled, for example, kept below a threshold, with a Zener diode 314.

A set of current sensing resistors 316, 318 may be connected between an emitter and a base of the current sensing transistor 312. Although the power conditioning module 302 includes two current sensing resistors 316, 318, connected in parallel, each embodiment of the invention is not so limited. The set of current sensing resistors 316, 318 may include any suitable number of resistors arranged in any suitable configuration. The set of current sensing resistors 316, 318 may be further connected between the negative polarity of the operating voltage and a source of the current control transistor 308. A load, such as the LED load 102 (FIG. 1), for the power conditioning module 302 may be connected between a drain of the current control transistor 308 and the positive polarity of the operating voltage. Hence the set of current sensing resistors 316, 318, the current control transistor 308 and the load may be connected in series between the negative and positive polarities of the operating voltage.

Hence the set of current sensing resistors 316, 318 may play a dual role in influencing the operation of the current sensing transistor 312 as well as influencing a load that consumes electric power delivered at the operating voltage. In an embodiment of the invention, power dissipated by the set of current sensing resistors 316, 318 may be significant. Hence it may be desirable to optimize, for example, minimize, an effective resistance value of the set of current sensing resistors 316, 318.

Components 308, 310, 312, 314, 316 and 318 of the power conditioning module 302 may be considered as participating in a circuit module that regulates and/or limits current. In an embodiment of the invention, the power condition module 302 may consist essentially of the components 304, 306, 308, 310, 312, 314, 316, 318 arranged as depicted in FIG. 3. Alternatively, the power conditioning module 302 may further include a daylight harvesting module 320. In FIG. 3, the daylight harvesting module 320 is delineated with a dashed line to indicate that its components are integrated into a circuit module providing functionality of the power conditioning module 302.

The daylight harvesting module 320 may be implemented with as few as two components: a phototransistor 322 and a resistor 324 connected in series. An emitter of the phototransistor 322 may be connected to the negative polarity of the operating voltage. The resistor 324 may be connected between a collector of the phototransistor 322 and the gate of the current control transistor 308. Light incident on the phototransistor 322 may cause a current to flow through the resistor 324, thus influencing the voltage at the gate of the current control transistor 308. Hence more light received at the phototransistor 322 may result in less current flowing through the current control transistor 308 to a load connected to the power conditioning module 302 such as the LED load 102 (FIG. 1). Hence more light received at the phototransistor 322 may result in an automatic dimming of light generated by the LED load 102. A resistance value of the resistor 324 may be chosen to adjust this effect to suit an environment being lit by the LED lighting system 100 and/or aesthetic preferences.

Figure 9:
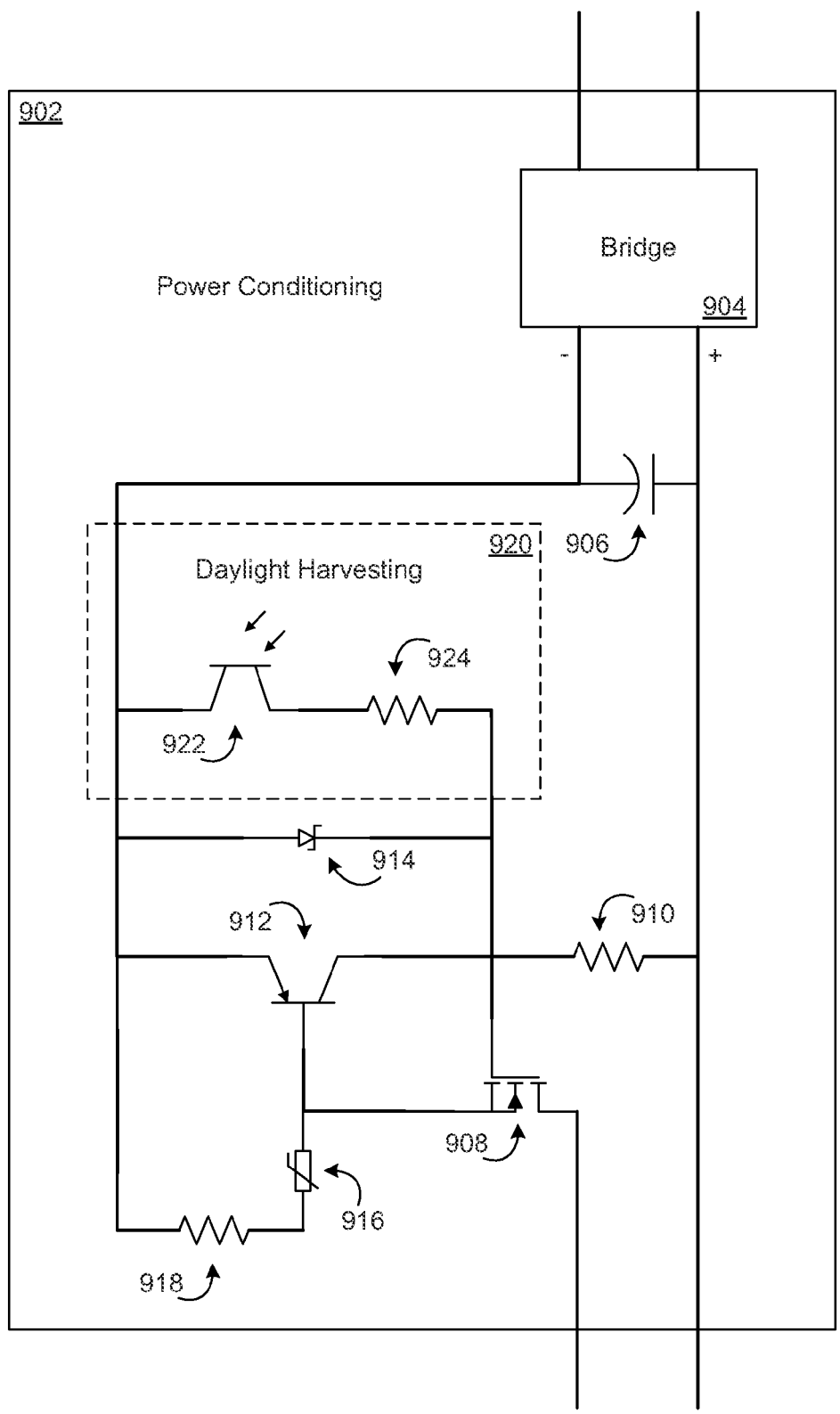
FIG. 9 is a schematic diagram depicting another example power conditioning module in accordance with an embodiment of the invention.

FIG. 9 depicts another example power conditioning module 902 in accordance with an embodiment of the invention. The power conditioning module 902 is also an example of the power conditioning module 108 of FIG. 1. The power conditioning module 902 may include components 904, 906, 908, 910, 912 and 914 corresponding to components 304, 306, 308, 310, 312 and 314 of FIG. 3, respectively. The power conditioning module 902 may further include a daylight harvesting module 920 and components 922, 924 corresponding to the daylight harvesting module 320 and the components 322, 324 of FIG. 3, respectively. In an embodiment of the invention, the power conditioning module 902 may include a thermistor 916 and a resistor 918 instead of the current sensing resistors 316, 318 of FIG. 3.

The thermistor 916 and the resistor 918 may be connected in series between an emitter and a base of the current sensing transistor 912. In an embodiment of the invention, the thermistor 916 is a positive temperature coefficient (PTC) thermistor. Although FIG. 9 depicts a single thermistor 916 and a single resistor 918 connected in series, each embodiment of the invention is not so limited. Any suitable number of thermistors and resistors in any suitable configuration, including in parallel, may be substituted for the depicted thermistor 916 and the resistor 918. In an embodiment of the invention, the resistor 918 may be omitted.

The thermistor 916 and the resistor 918 may play a role in the power conditioning module 902 corresponding to that of the current sensing resistors 316, 318 of FIG. 3. Alternatively, or in addition, the thermistor 916 and the resistor 918 may act to regulate temperature in a load such as the LED load 102 (FIG. 1). For example, the thermistor 916 and the resistor 918 may be selected and configured with respect to the current sensing transistor 912 and the current control transistor 908 such that an increase in a temperature of the thermistor 916 results in a decrease in current flowing to the load. Current flowing through the load may be correlated with the temperature of the load. Accordingly, the temperature of the load may be regulated based at least in part on the temperature of the thermistor 916. For some loads, such as the LED load 102, regulating (e.g., limiting) the load temperature can improve an operational lifetime of the load.

Figure 4:
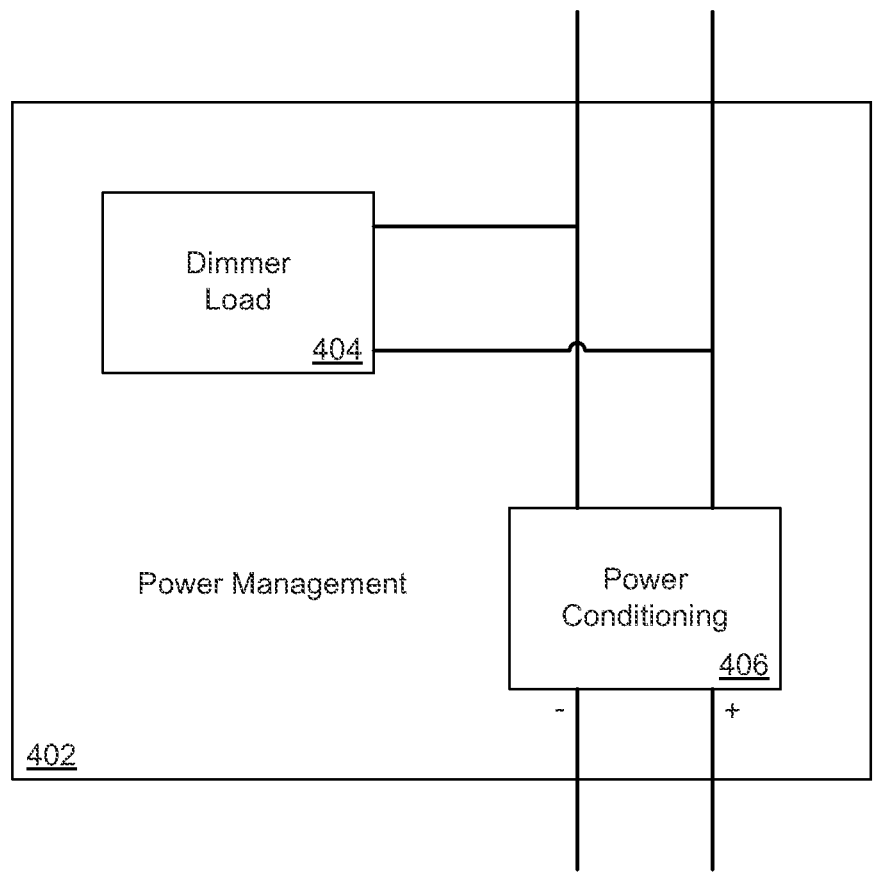
FIG. 4 is a schematic diagram depicting an example power management module in accordance with an embodiment of the invention.

As described above, the power management module 104 of FIG. 1 may include a dimmer load 110. FIG. 4 depicts an example power management module 402 including a dimmer load 404 in accordance with an embodiment of the invention. The power management module 402 further includes a power conditioning module 406. The power management module 402, the dimmer load 404 and the power conditioning module 406 are examples of the power management module 104, the dimmer load 110 and the power conditioning module 108 of FIG. 1, respectively.

Figure 5:
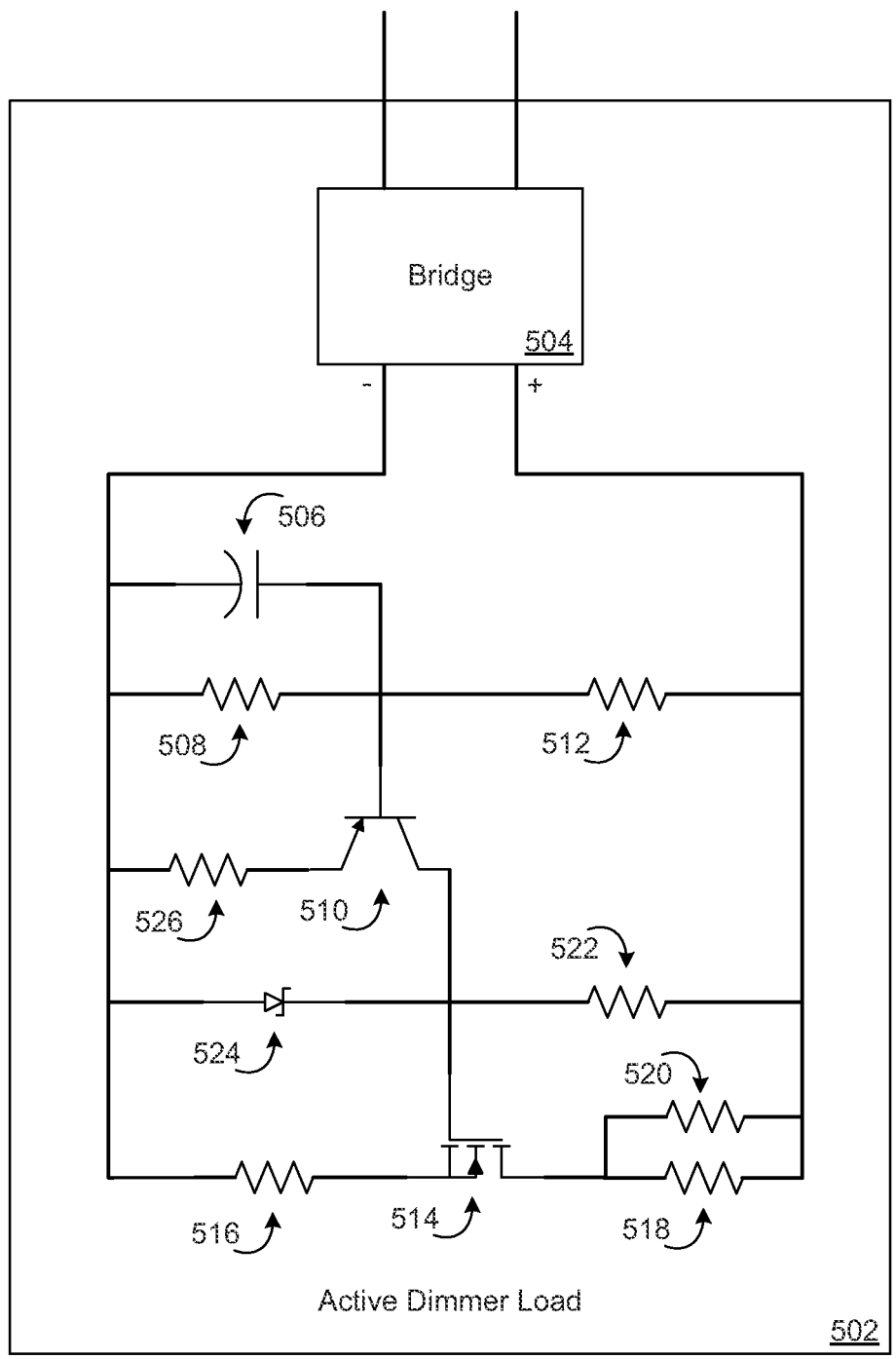
FIG. 5 is a schematic diagram depicting an example active dimmer load in accordance with an embodiment of the invention.

In the power management module 402 of FIG. 4, the power conditioning module 406 is connected to a power source such as the power source 106, as well as to a load such as the LED load 102. The dimmer load 404 is also connected to the power source, in parallel with the power conditioning module 406. The dimmer load 404 may be an active dimmer load or a passive dimmer load. For example, a resistor (not shown in FIG. 4) may serve as a passive dimmer load. However, in an embodiment of the invention, energy losses to a passive dimmer load are significant. Hence an active dimmer load may be desirable. FIG. 5 depicts an example active dimmer load 502 in accordance with an embodiment of the invention.

The active dimmer load 502 may receive electric power from the power source at a bridge 504. The bridge 504 may be any suitable bridge rectifier including a diode bridge rectifier. The rectified output of the bridge 504 may be smoothed with a power factor correction (PFC) capacitor 506. The PFC capacitor 506 may be connected in parallel with a resistor 508 between the negative polarity of the bridge 504 output and a base of a transistor 510. For example, the resistor 508 may have a resistance value on the order of 10 kilohms. The transistor 510 may be any suitable transistor such as a bipolar junction transistor. The base of the transistor 510 may be separated from the positive polarity of the bridge 504 output by a resistor 512. For example, the resistor 512 may have a resistance value on the order of 1 megohm.

A collector of the transistor 510 may be connected to a gate of a transistor 514. The transistor 514 may be any suitable transistor such as a field effect transistor. A resistor 516 may connect a source of the transistor 514 to the negative polarity of the bridge 504 output. A set of resistors 518, 520, connected in parallel, may connect a drain of the transistor 514 to the positive polarity of the bridge 504 output. Resistance values may be chosen for the resistor 516 and the set of resistors 518, 520 so as to present a suitable load to conventional dimmer components, reduce and/or minimize flickering during significant dimming, and/or optimize, for example, minimize, power dissipation due to current flow through the transistor 514.

A resistor 522 may separate the collector of the transistor 510 and the gate of the transistor 514 from the positive polarity of the bridge 504 output. For example, the resistor 522 may have a resistance value on the order of 1 megohm. The voltage at the gate of the transistor 514 may be controlled, for example, kept below a threshold, with a Zener diode 524. A resistor 526 may separate an emitter of the transistor 510 from the negative polarity of the bridge 504 output. For example, the resistor 526 may have a resistance value on the order of 2 kilohm.

Figure 6:
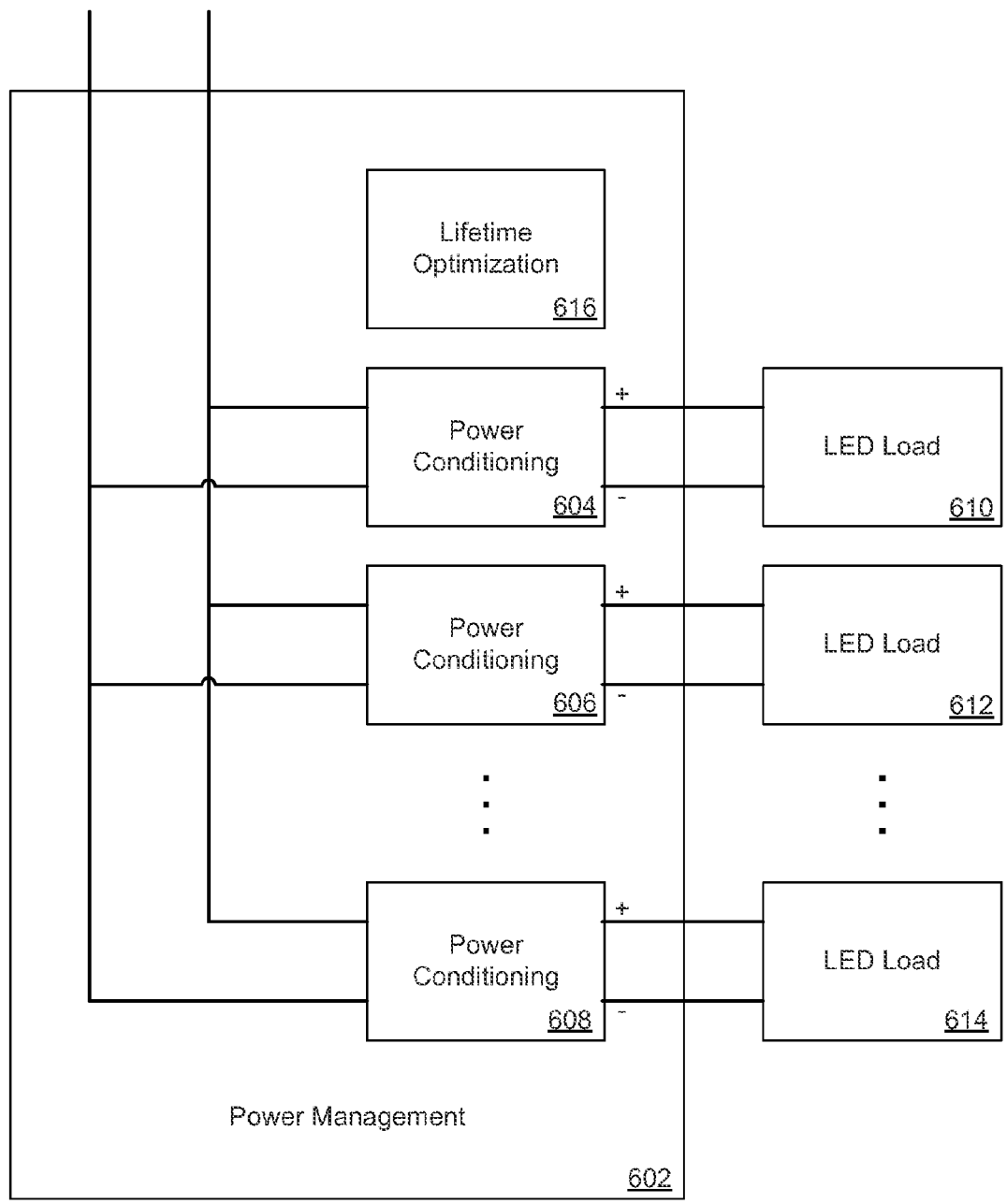
FIG. 6 is a schematic diagram depicting an example power management module incorporating a lifetime optimization module in accordance with an embodiment of the invention.

As described above, the power management module 104 (FIG. 1) may include multiple power conditioning modules corresponding to the power condition module 302 (FIG. 3) each providing power to an LED load corresponding to the LED load 202 (FIG. 2). FIG. 6 depicts an example power management module 602 including multiple power conditioning modules 604, 606, 608 in accordance with an embodiment of the invention. In FIG. 6, the power conditioning module 606 and the power conditioning module 608 are separated by a " . . . " symbol to indicate that the power management module 602 may include any suitable number of power conditioning modules 604, 606, 608.

Each power conditioning module 604, 606, 608 may power a corresponding LED load 610, 612, 614. Power conditioning module and LED load pairs (e.g., 604 and 610, 606 and 612, 608 and 614) may be considered an LED string. The set of power condition modules 604, 606, 608 may be collectively controlled by a lifetime optimization module 616.

The lifetime optimization module 616 may cause each LED string 604 and 610, 606 and 612, 608 and 614 to be active or inactive. The lifetime optimization module 616 may set a dimming level for each LED string 604 and 610, 606 and 612, 608 and 614. The lifetime optimization module 616 may activate a portion of the LED strings 604 and 610, 606 and 612, 608 and 614 during a time period. The lifetime optimization module 616 may randomly and/or pseudorandomly select which of the LED strings 604 and 610, 606 and 612, 608 and 614 are active during a time period. The lifetime optimization module 616 may track one or more operational ages of the LED strings 604 and 610, 606 and 612, 608 and

614. The lifetime optimization module 616 may adjust a proportion of the LED strings 604 and 610, 606 and 612, 608 and 614 active during a time period based on operational ages of the LED strings 604 and 610, 606 and 612, 608 and 614. For example, the lifetime optimization module 616 may adjust the proportion of the LED strings 604 and 610, 606 and 612, 608 and 614 active during a time period so as to maintain a target luminance as the light-emitting diodes in the LED loads 610, 612, 614 age, e.g., to compensate for a reduced performance.

Figure 7:
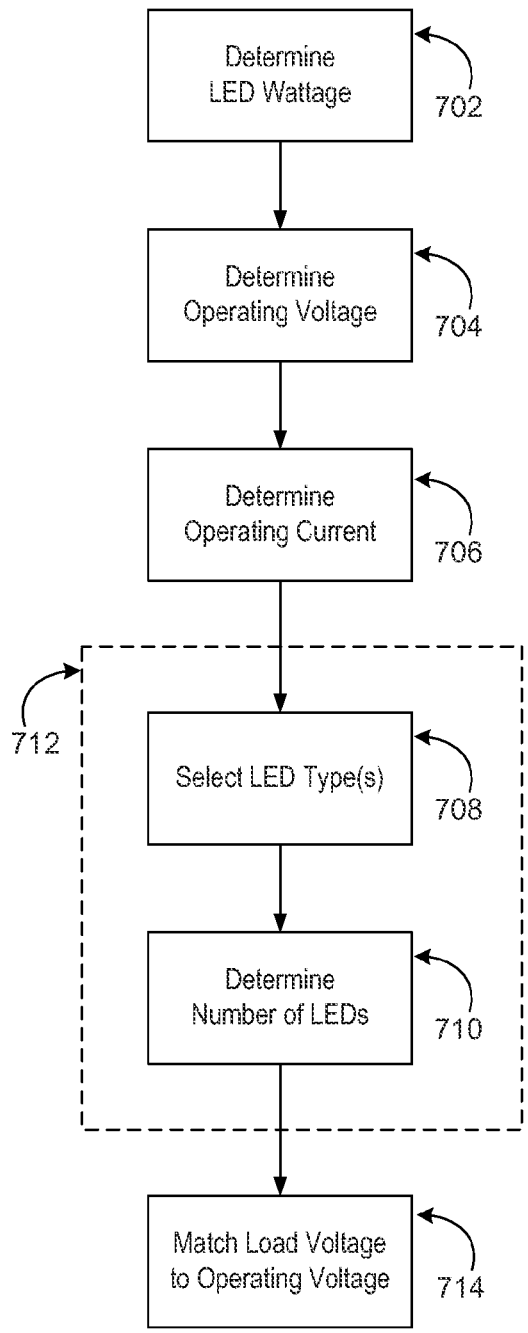
FIG. 7 is a flowchart depicting example steps for effecting an LED lighting system in accordance with an embodiment of the invention.

To achieve optimum performance for the LED lighting system 100 (FIG. 1), it will be helpful to set forth procedures for selecting components thereof. FIG. 7 depicts example steps for effecting the LED lighting system 100 in accordance with an embodiment of the invention. At step 702, an LED wattage may be determined. For example, the LED wattage may be determined as a product of a target luminance and a specified watts per lumen figure. The target luminance may correspond to a luminance of an existing system, a value specified by a standard, and/or an aesthetic preference. The specified watts per lumen figure may be derived statistically from attributes of a set of available types of light-emitting diode. For example, the watts per lumen figure may be an optimum, a maximum, an average and/or an economically weighted average of watts per lumen figures of types of light-emitting diode in the set. As one example, a same luminance provided by 60 watt incandescent lighting may be provided by approximately 8 watt LED lighting (due to the higher luminous efficiency of LED lighting).

At step 704, an operating voltage may be determined. For example, the operating voltage may be determined based on a supply voltage such as the output of the power source 106 (FIG. 1). The operating voltage determined at step 704 may correspond to the voltage across the capacitor 306 in the power conditioning module 302 of FIG. 3. The operating voltage across the capacitor 306 may be derived from the voltage supplied to the bridge 304 in a manner well known to those of skill in the art. As described above, 120 volt alternating current mains power supplied to the bridge 304 may result in a 151 volts direct current operating voltage across the capacitor 306.

At step 706, an operating current may be determined. For example, the operating current may be calculated as the LED wattage divided by the operating voltage. As one example, 8 watts divided by 151 volts is approximately 53 milliamps. The operating current thus determined may be a maximum or peak operating current.

At step 708, one or more types of light-emitting diode (LED) may be selected. For example, a type of light-emitting diode may be selected from the set of available types of light-emitting diode based on the operating current and/or the operating voltage in accordance with current and/or voltage ratings of the type. At step 710, a number of light-emitting diodes may be determined. For example, the type of light-emitting diode selected at step 708 may have an associated voltage drop when operated at the operating current, and the number of light-emitting diodes may be calculated as the greatest integer multiple of that voltage drop that is less than the operating voltage. Continuing the one example, the voltage drop may be 3.1 volts, hence the number of light-emitting diodes determined is 48. Where more than one type of light-emitting diode is selected at step 708, a sum of integer multiples of voltage drops associated with each type may be found so that the sum is less than the operating voltage.

Together, steps 708 and 710 may determine a set of light-emitting diodes. For example, the steps 708 and 710 may be utilized to determine the set of light-emitting diodes to be incorporated into the LED load 202 of FIG. 2. This is indicated in FIG. 7 with a dashed line 712. To continue the example, suppose the LED load 202 is supplied with power by the power conditioning module 302 of FIG. 3. At the operating current, a load voltage may be understood as developing across the LED load 202, the current control transistor 308 and the set of current sensing resistors 316, 318. Since the LED load 202 includes an integer number of light-emitting diodes, the component of the load voltage across the LED load 202 alone may not match the operating voltage (e.g., as determined at step 704). In an embodiment of the invention, power losses are optimized, for example, minimized, when the load voltage matches the operating voltage.

At step 714, the load voltage may be matched to the operating voltage. For example, the current control transistor 308 and/or the set of current sensing resistors 316, 318 (FIG. 3) may be chosen so that the load voltage matches the operating voltage. The load voltage may be considered to match the operating voltage if an absolute value of a difference between them is less than a threshold. Alternatively, the load voltage may match the operating voltage if a difference between them lies between a lower threshold and an upper threshold. Since both the load voltage and the operating voltage may vary over time, statistical attributes of the respective time series may be utilized to determine a match. For example, a difference between peak values, average values, standard deviation values, etc, may be required to lie between associated thresholds.

Figure 8:
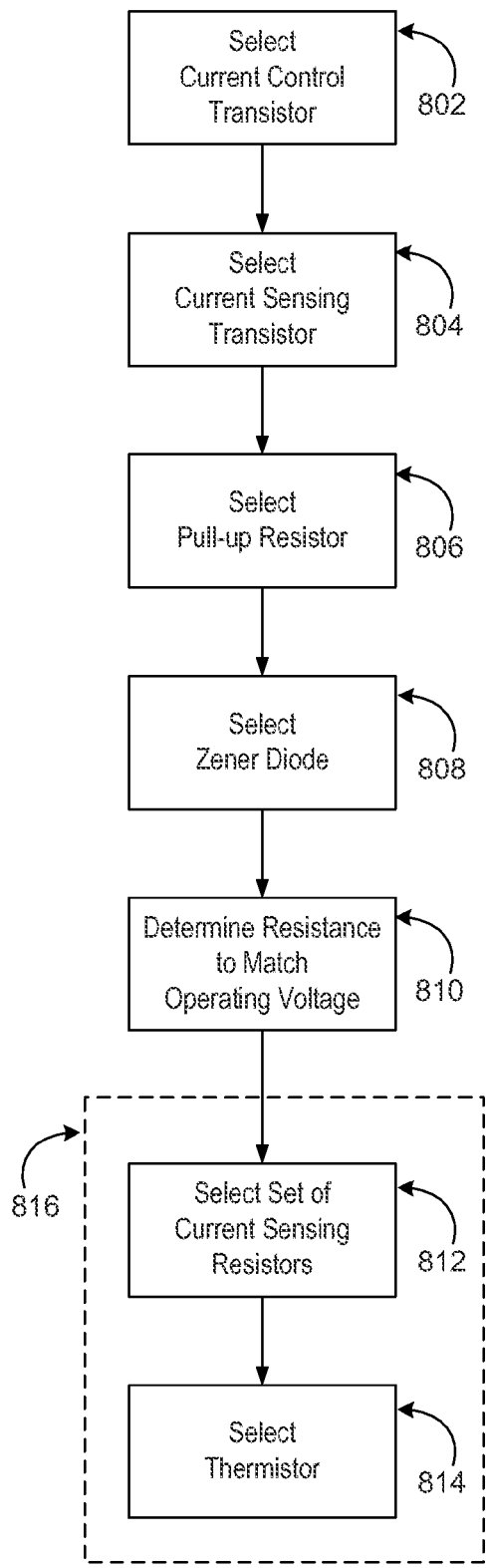
FIG. 8 is a flowchart depicting further example steps for effecting an LED lighting system in accordance with an embodiment of the invention.

As described above, the set of current sensing resistors 316, 318 may perform a dual role in the power conditioning module 302 of FIG. 3. Consequently, selection of the set of current sensing resistors 316, 318 may depend on one or more factors other than a goal of matching the load voltage to the operating voltage. FIG. 8 depicts further example steps for effecting the LED lighting system 100 (FIG. 1) in accordance with an embodiment of the invention.

At step 802, a current control transistor may be selected. For example, the current control transistor 308 of FIG. 3 may be selected based on an operating current such as the operating current determined at step 706 of FIG. 7 and/or an operating voltage such as the operating voltage determined at step 704. The current control transistor 308 may be chosen to have an optimal, for example, minimal, economic cost while being able to safely, for example, continuously, handle the operating current and/or the operating voltage. At step 804, a current sensing transistor may be selected. For example, the current sensing transistor 312 may be selected based on the current control transistor selected at step 802.

At step 806, a pull-up resistor may be selected. For example, the pull-up resistor 310 (FIG. 3) may be selected based on the current control transistor selected at step 802 and/or the operating voltage determined at step 704 of FIG. 7. The pull-up resistor may also be selected to minimize noise, e.g., electro-magnetic noise generated by rectification. At step 808, a Zener diode may be selected. For example, the Zener diode 314 may be selected based on one or more attributes of the current control transistor selected at step 802 such as a safe, for example, maximum, operating voltage for a gate of the current control transistor.

At step 810, a resistance value may be determined that will enable the load voltage to be matched to the operating voltage. For example, given the set of light-emitting diodes selected at step 712 of FIG. 7, a corresponding load voltage component may be calculated from attributes of the light-emitting diodes in the set assuming that they are powered by the operating current. Another such load voltage component may be calculated for the current control transistor 308. Call the difference between the sum of these load voltage components and the operating voltage (e.g., as determined at step 704) the residual voltage. Then the looked-for resistance value may be determined as the residual voltage divided by the operating current. Continuing the one example, the resistance value might be 0.7 volts/53 milliamps to yield 13 ohms.

At step 812, a set of current sensing resistors may be selected. For example, the set of current sensing resistors 316, 318 of FIG. 3 may be selected and arranged so as to yield the resistance value determined at step 810. In an embodiment of the invention, a minimum wattage for the set of current sensing resistors may be determined as three times the product of the residual voltage and the operating current.

When the thermistor 916 and resistor 918 of FIG. 9 are utilized in place of, or in addition to, the set of current sensing resistors 316, 318 of FIG. 3, a suitable thermistor 916 may be selected at step 814. The thermistor 916 may be selected such that its temperature-resistance characteristic, modified by the resistor 918, regulates the operating current in accordance with a desired temperature compensation curve and/or decreases the operating current at a specified rate with respect to temperature over a specified range of temperatures. For example, the thermistor 916 and resistor 918 may be selected to collectively provide 13 ohms of electrical resistance at ambient temperature. Given a particular thermistor 916, the value of the resistor 918 may be selected to yield the desired temperature compensation curve over the specified range of temperatures. For example, a 10 ohm thermistor 916 and a 10 ohm resistor 918 in series may yield a more gradual decrease in operating current over the specified range of temperatures than a 20 ohm thermistor alone. When the thermistor 916 and resistor 918 also play the role of the set of current sensing resistors 316, 318, step 812 and step 814 may be integrated and/or iterative, as indicated by dashed line 816.

Steps described with reference to FIG. 7 and FIG. 8, and like steps, may be implemented with and/or facilitated by one or more suitable computing devices. A computer is an example of a suitable computing device. Suitable computing devices may include one or more processing units (e.g., CPUs) capable of executing instructions to perform tasks, as well as one or more types of computer-readable media such as volatile memory and non-volatile memory capable of storing data, computer programs and/or computer program components. Such computer programs and components may include executable instructions, structured data and/or unstructured data organized into program modules, routines and/or any suitable programmatic object. Such computer programs and program components may be created by and/or incorporate any suitable computer programming language. In an embodiment of the invention, each computing device may be a special purpose computer.

Examples of computer-readable media suitable for reading by computing devices include any one or more of magnetic media (such as hard disks and flash drives), optical media such as compact disks (CDs) and communication media. Communication media may include any one or more of wired communication media such as copper wire, coaxial cable and optical fiber, as well as wireless communication media such as electro-magnetic media including radio, microwave, infrared and laser light. In an embodiment of the invention, each computer-readable medium may be tangible. In an embodiment of the invention, each computer-readable medium may be non-transitory in time, for example, data stored in the computer-readable medium may persist for a perceptible and/or measurable amount of time.

Unless otherwise indicated, or clearly implied by context, component types and/or attribute values of components in circuit modules described herein may be selected according to methods and/or formulae well known to those of skill in the art.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to an embodiment of the invention.

Preferred embodiments of the invention are described herein, including the best mode known to the inventors for carrying out the invention. Variations of those preferred embodiments may become apparent to those of ordinary skill in the art upon reading the specification. The inventors expect skilled artisans to employ such variations as appropriate, and the inventors intend for the invention to be practiced otherwise than as explicitly described herein. Accordingly, embodiments of the invention include all modifications and equivalents of the subject matter recited in the following claims as permitted by applicable law.

What is claimed is:

1. An LED lighting system, comprising:
a set of light-emitting diodes;
a first circuit module configured at least to maintain an operating voltage; and
a second circuit module comprising a set of transistors and a set of resistors, the second circuit module configured to, at least, provide power to the set of light-emitting diodes, regulate a current flowing through the set of light-emitting diodes and match a load voltage across at least the set of light-emitting diodes, at least one of the set of transistors and at least one of the set of resistors to the operating voltage, wherein the load voltage matches the operating voltage if an absolute difference between the load voltage and the operating voltage is less than a threshold.

2. The system of claim 1, wherein the set of light-emitting diodes comprises a plurality of light-emitting diodes having at least one matching attribute.

3. An LED lighting system, comprising:
a set of light-emitting diodes;
a first circuit module configured at least to maintain an operating voltage; and
a second circuit module comprising a set of transistors and a set of resistors including a plurality of resistors connected in parallel, the second circuit module configured to, at least, provide power to the set of light-emitting diodes, regulate a current flowing through the set of light-emitting diodes and match a load voltage across at least the set of light-emitting diodes, at least one of the set of transistors and at least one of the set of resistors to the operating voltage.

4. The system of claim 1, wherein the set of transistors comprises:
a first transistor that is a field effect transistor; and
a second transistor connected at least to a gate of the first transistor.

5. The system of claim 4, wherein the current flowing through the set of light-emitting diodes is regulated with at least the first transistor and the second transistor.

6. An LED lighting system, comprising:
a set of light-emitting diodes;
a first circuit module configured at least to maintain an operating voltage; and
a second circuit module comprising a set of transistors and a set of resistors, the second circuit module configured to, at least, provide power to the set of light-emitting diodes, regulate a current flowing through the set of light-emitting diodes and match a load voltage across at least the set of light-emitting diodes, at least one of the set of transistors and at least one of the set of resistors to the operating voltage,
wherein the set of transistors comprises a first transistor that is a field effect transistor and a second transistor connected at least to a gate of the first transistor, the current flowing through the set of light-emitting diodes is regulated with at least the first transistor and the second transistor, and regulating the current flowing through the set of light-emitting diodes comprises maintaining the current flow less than or substantially equal to a threshold value.

7. An LED lighting system, comprising:
a set of light-emitting diodes;
a first circuit module configured at least to maintain an operating voltage; and
a second circuit module comprising a set of transistors and a set of resistors, the second circuit module configured to, at least, provide power to the set of light-emitting diodes, regulate a current flowing through the set of light-emitting diodes and match a load voltage across at least the set of light-emitting diodes, at least one of the set of transistors and at least one of the set of resistors to the operating voltage, wherein the second circuit module further comprises a phototransistor and a resistor for daylight harvesting.

8. The system of claim 7, wherein:
the phototransistor and the resistor for daylight harvesting are connected in series; and
the resistor for daylight harvesting is connected to at least one of the set of transistors.

9. The system of claim 7, wherein a value of the resistor for daylight harvesting corresponds to an amount of dimming of the set of light-emitting diodes in response to light received at the phototransistor.

10. The system of claim 1, wherein the LED lighting system is a dimmable LED lighting system.

11. An LED lighting system, comprising:
a set of light-emitting diodes;
a first circuit module configured at least to maintain an operating voltage;
a second circuit module comprising a set of transistors and a set of resistors, the second circuit module configured to, at least, provide power to the set of light-emitting diodes, regulate a current flowing through the set of light-emitting diodes and match a load voltage across at least the set of light-emitting diodes, at least one of the set of transistors and at least one of the set of resistors to the operating voltage; and
a dimmer load,
wherein the LED lighting system is a dimmable LED lighting system.

12. An LED lighting system, comprising:
a plurality of sets of light-emitting diodes;
a first circuit module configured at least to maintain an operating voltage;
for each of the plurality of sets of light-emitting diodes, a second circuit module comprising a set of transistors and a set of resistors, the second circuit module configured to, at least, provide power to the set of light-emitting diodes, regulate a current flowing through the set of light-emitting diodes and match a load voltage across at least the set of light-emitting diodes, at least one of the set of transistors and at least one of the set of resistors to the operating voltage; and
a lifetime optimization module configured at least to select which of the plurality of sets are powered during a time period.

13. The system of claim 12, wherein the ones of the plurality of sets that are powered during the time period are selected pseudorandomly.

14. The system of claim 12, wherein the proportion of the plurality of sets that are powered during the time period is determined based at least in part on an operating age of light-emitting diodes in the sets of the plurality.

15. An LED lighting system, comprising:
a set of light-emitting diodes;
a first circuit module configured at least to maintain an operating voltage;
a second circuit module comprising a set of transistors, a set of resistors and a positive temperature coefficient thermistor, the second circuit module configured to, at least:
provide power to the set of light-emitting diodes, regulate a current flowing through the set of light-emitting diodes and match a load voltage across at least the set of light-emitting diodes, at least one of the set of transistors and at least one of the set of resistors to the operating voltage; and
regulate a temperature of the set of light-emitting diodes based at least in part on a temperature of the positive temperature coefficient thermistor.

16. A method of effecting an LED lighting system, comprising:
determining an operating current based on, at least, a target luminance and an operating voltage;
selecting a set of light-emitting diodes based on, at least, the operating current;
selecting a set of resistors in a circuit module that provides power to the set of light-emitting diodes, the selection of the set of resistors based at least in part on a goal of matching a load voltage across at least the set of light-emitting diodes, a set of transistors and the set of resistors to the operating voltage; and
selecting a positive temperature coefficient thermistor in the circuit module based at least in part on a goal of maintaining a temperature of the set of light-emitting diodes below a threshold value.

17. The method of claim 16, wherein selecting the set of light-emitting diodes comprises selecting a type of light-emitting diode having a nominal operating current near to the determined operating current.

18. The method of claim 16, wherein:
each light-emitting diode in the set has an associated voltage drop when operated at the operating current; and
selecting the set of light-emitting diodes comprises selecting the set of light-emitting diodes at least so that a sum of the associated voltage drops is less than or substantially equal to the operating voltage.

19. The method of claim 16, wherein the operating voltage comprises a rectified voltage.

20. The method of claim 16, wherein the selection of the set of resistors is based at least in part on a goal of matching a load voltage across at least the set of light-emitting diodes, the set of transistors, the positive temperature coefficient thermistor and the set of resistors to the operating voltage.

21. At least one non-transitory computer-readable medium collectively having thereon computer-executable instructions to facilitate, at least:
determining an operating current based on, at least, a target luminance and an operating voltage;
selecting a set of light-emitting diodes based on, at least, the operating current;
selecting a set of resistors for a circuit module for providing power to the set of light-emitting diodes, the selection of the set of resistors based at least in part on a goal of matching a voltage across at least the set of light-emitting diodes, a set of transistors and the set of resistors to the operating voltage; and
selecting a positive temperature coefficient thermistor in the circuit module based at least in part on a goal of maintaining a temperature of the set of light-emitting diodes below a threshold value.

22. An LED lighting system, comprising:
a set of light-emitting diodes;
a first circuit module configured at least to maintain an operating voltage; and
a second circuit module comprising a set of transistors and a positive temperature coefficient thermistor, the second circuit module configured to, at least:
provide power to the set of light-emitting diodes and regulate a temperature of the set of light-emitting diodes based at least in part on a temperature of the positive temperature coefficient thermistor; and
match a load voltage across at least the set of light-emitting diodes, at least one of the set of transistors and the positive temperature coefficient thermistor to the operating voltage.

* * * * *